April 8, 1924.
E. GRAHAM
PEDAL LOCK FOR AUTOMOBILES
Filed Feb. 14, 1921
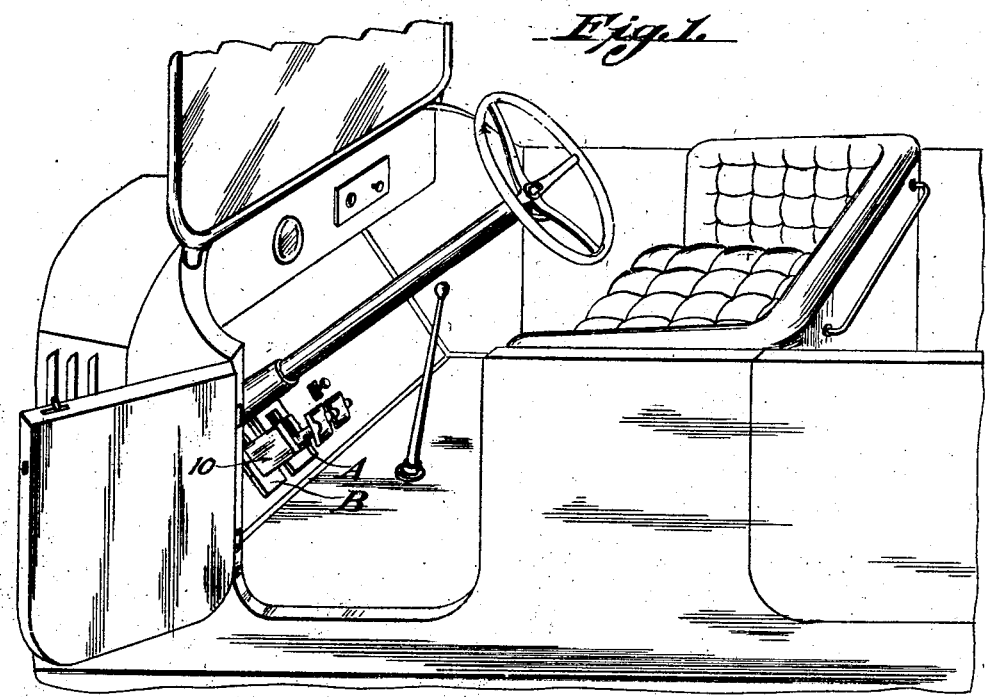
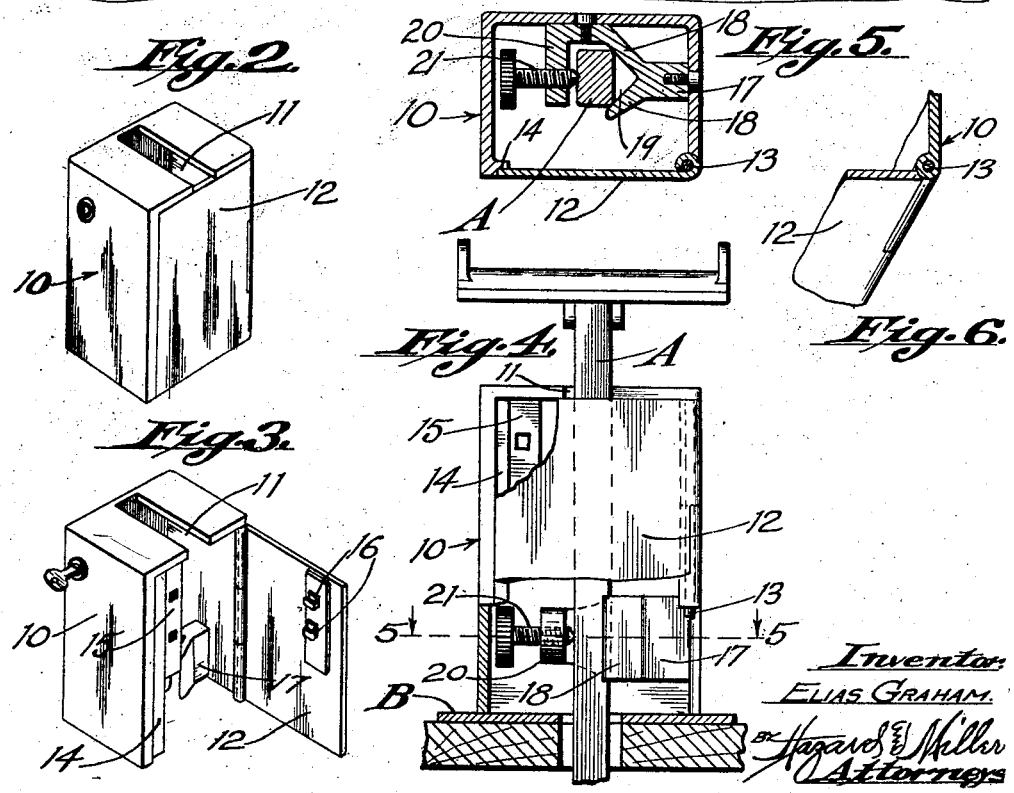
Inventor:
ELIAS GRAHAM.

Patented Apr. 8, 1924.

1,489,574

UNITED STATES PATENT OFFICE.

ELIAS GRAHAM, OF LOS ANGELES, CALIFORNIA.

PEDAL LOCK FOR AUTOMOBILES.

Application filed February 14, 1921. Serial No. 444,684.

*To all whom it may concern:*

Be it known that I, ELIAS GRAHAM, a citizen of the United States, residing at Los Angeles, in the county of Los Angeles and State of California, have invented new and useful Improvements in Pedal Locks for Automobiles, of which the following is a specification.

My invention relates to new and useful improvements in locking devices for the clutch pedal of motor vehicles, the principal objects of my invention being to provide a relatively simple, practical, durable and efficient device that may be easily and quickly applied to or removed from the clutch pedal of a motor vehicle and which device when properly applied, will effectively lock said pedal against downward movement, thereby preventing unauthorized use or theft of the vehicle; further, to provide a locking device that is capable of being easily and cheaply produced, and further, to provide a device which is constructed so that when it is unlocked it can be bodily removed from the vehicle and the clutch pedal so that when unlocked, said pedal, without incumbrance, may be operated in the usual manner.

With the foregoing and other objects in view, my invention consists in certain novel features of construction and arrangement of parts that will be hereinafter more fully described and claimed and illustrated in the accompanying drawings, in which—

Fig. 1 is a perspective view of a portion of the body or tonneau of a motor vehicle and showing my improved lock in position upon the clutch pedal.

Fig. 2 is a perspective view of the locking device, the same being shown in closed or locked position.

Fig. 3 is a perspective view of the locking device and with the parts thereof in open or unlocked position.

Fig. 4 is an elevational view of the locking device in position upon the clutch pedal and with portions of said device in vertical section.

Fig. 5 is a horizontal section taken on the line 5—5 of Fig. 4.

Fig. 6 is a detail perspective view with parts in section and showing the hinge connection between a swinging plate or door and the housing of the lock.

Referring by numerals to the accompanying drawings, which illustrate a practical embodiment of my invention, 10 designates the main body portion of the lock, the same being in the form of a substantially rectangular housing that is preferably constructed from a single piece of metal, either pressed or cast, said housing being provided with an open bottom and in its top plate with a slot 11 that is adapted to receive the arm or lever A of the clutch pedal and which latter operates in the usual manner through a slotted floor plate B.

The front of the box or housing 10 is normally closed by a door 12 in the form of a metal plate, the same being hinged upon a pin 13 that is seated in the front edge of one of the side walls of the housing. The free edge of this hinged plate or door is adapted to occupy a recess 14 that is formed in the front edge of the side wall of the housing opposite the side wall to which said plate is hinged, and the upper edge of said door, when closed, is adapted to lie immediately beneath the front edge of the top of the box or housing, and thus when the door is closed, its outer face lies flush with the front edge of the top of the box and with the front edge of the side wall in which recess 14 is formed, thereby providing a construction which minimizes the liability of the hinged plate or door being pried open by the use of a pointed or edged tool.

Arranged within the housing, and preferably on the upper portion of the side wall that is provided with the recessed front edge, is a suitable lock 15, preferably of the type that is key controlled and having one or more locking bolts and which latter are adapted to engage hooks such as 16 that are secured on the inner face of the hinged plate or door 12.

Formed integral with or fixed to the box or housing 10 and arranged on the interior thereof is a short horizontally disposed arm or block 17, the same being bifurcated to form diverging arms 18, one of which latter is preferably secured to the rear wall of the housing and said arms providing a vertically disposed angular recess 19 that is adapted to receive the clutch pedal A when the locking device is applied for use.

Rigidly fixed to the housing 10 and disposed directly in front of the recess 19 is a lug 20 that is provided with a horizontally disposed threaded aperture in which latter is seated the threaded shank of a set screw 21, the forward end of said shank being preferably pointed.

In applying my improved lock, the plate or door 12 is opened, and after retracting set screw 21 the device is positioned on the clutch pedal A with the latter arranged in the recess 19 between the diverging arms 18 and said pedal projecting through the slot 11 in the top of the lock housing. Set screw 21 is now manipulated so that its pointed end impinges against the side face of the clutch pedal and clamps the same securely against the diverging arms 18, after which the hinged plate or door 12 is closed and locked; and when so arranged and with the lower end of the lock housing resting upon the surface of slotted plate B, the clutch pedal will be firmly locked against downward movement, and consequently the vehicle to which the lock is applied cannot be operated.

A locking device of my improved construction is very compact, may be easily applied to or removed from the clutch pedal, and said device provides simple and efficient means for securely locking the clutch pedals of practically all forms of motor vehicles.

On some makes of cars, the foot plate at the upper end of the clutch pedal arm or lever is readily removable, but by providing means within the housing for rigidly securing the same to the pedal arm as, for instance, the set screw 21, it is imposible for a car that is equipped with my improved lock to be operated, even though the foot plate at the top of the pedal arm be removed, by unauthorized persons with the intention of sliding the locking device upwardly on the pedal arm, for, as will be understood, the set screw that is wholly inclosed within the housing firmly secures the latter to the pedal arm.

It will be readily understood that minor changes in the size, form and construction of the various parts of my improved locking device may be made and substituted for those herein shown and described without departing from the spirit of my invention, the scope of which is set forth in the appended claims.

I claim as my invention:

1. A motor vehicle clutch pedal locking device, comprising a housing adapted to be applied to the clutch pedal, a substantially Y-shaped block secured within the housing and adapted to receive the clutch pedal to which said housing is applied, an extension on one of the arms of said block, a set screw seated in said extension and adapted to engage the clutch pedal positioned in said block, a hinged member closing one side of the housing and a lock for retaining said hinged member in closed position.

2. In a motor vehicle clutch pedal lock, a housing adapted to be applied to the clutch pedal, means within said housing and provided with a seat adapted to receive the clutch pedal to which the device is applied, a set screw arranged adjacent to said seat and adapted to engage the pedal and hold the same positioned upon said seat, a hinged member forming a part of the housing and means for locking said hinged member in closed position.

3. In a locking device of the character described, a housing, a substantially Y-shaped block secured within the housing, an extension on one of the arms of said block, and a set screw seated in said extension and adapted to secure the clutch pedal within said block.

4. The combination with a movable pedal and fixed part, of means for locking said pedal and part against relative movement; said means comprising a housing, means within said housing for receiving and by manual adjustment clamping one of a plurality of different size pedals against movement within the housing, and releasable means for preventing access to said means.

5. The combination with a movable pedal and fixed part, of means for locking said pedal and part against relative movement; said means comprising a housing including a door, a member carried by and within said housing adapted to receive said pedal, a set screw carried by said member and adapted to clamp said pedal in said member and means for locking the door in closed position.

6. In combination, a control pedal, a fixed element in the path of movement of the pedal, means for locking the pedal against movement with relation to said element comprising a housing, a member secured to and disposed within said housing for receiving said pedal, manually adjustable means carried by the member and disposed within the housing for clamping the pedal within the member.

In testimony whereof I have signed my name to this specification.

ELIAS GRAHAM.